United States Patent [19]
Jeter et al.

[11] 4,356,629
[45] Nov. 2, 1982

[54] METHOD OF MAKING WELL LOGGING APPARATUS

[75] Inventors: John D. Jeter, Iowa Park, Tex.; Henry S. More, Carmichael, Calif.

[73] Assignee: Exploration Logging, Inc., Sacramento, Calif.

[21] Appl. No.: 141,769

[22] Filed: Apr. 21, 1980

[51] Int. Cl.³ .............................................. H01R 43/00
[52] U.S. Cl. ...................................... 29/885; 166/66; 175/50; 29/458
[58] Field of Search ................. 29/846, 825, 885, 458; 175/50; 166/66; 427/96

[56] References Cited

U.S. PATENT DOCUMENTS

| | | | |
|---|---|---|---|
| 1,744,911 | 1/1930 | Masin | 29/619 |
| 2,344,598 | 3/1944 | Church . | |
| 2,364,957 | 12/1944 | Douglas . | |
| 2,568,241 | 9/1951 | Martin . | |
| 2,857,451 | 10/1958 | Barclay . | |
| 2,871,444 | 1/1959 | Piety . | |
| 2,925,251 | 2/1960 | Arps . | |
| 2,930,137 | 3/1960 | Arps . | |
| 2,938,708 | 5/1960 | Arps . | |
| 3,072,843 | 1/1963 | Clements et al. . | |
| 3,079,549 | 2/1963 | Martin . | |
| 3,134,069 | 5/1964 | Clements et al. . | |
| 3,149,683 | 9/1964 | Clements et al. . | |
| 3,293,542 | 12/1966 | Piety . | |
| 3,377,549 | 4/1968 | Newman et al. . | |
| 3,381,215 | 4/1968 | Osborn . | |
| 3,408,561 | 10/1968 | Redwine et al. . | |
| 3,466,597 | 9/1969 | Richter, Jr. et al. . | |
| 4,152,195 | 5/1979 | Bährle | 427/96 X |

OTHER PUBLICATIONS

"The Results of In-Hole Testing of the Pipe-Mounted Sonde for Logging While Drilling", A. I. Talayan et al., Burenie (Drilling), No. 8, 1976.
"Pipe-Mounted Sonde for Logging-While-Drilling", I. K. Sarkisov et al., Azerb. Neft. Khoz., No. 3, 1971.

*Primary Examiner*—Francis S. Husar
*Assistant Examiner*—Carl J. Arbes
*Attorney, Agent, or Firm*—Christie, Parker & Hale

[57] ABSTRACT

A replaceable insulating sleeve is disposed around the lower end of a drill string used in drilling a well. The sleeve is restrained from rotating relative to the drill string, but can be released and quickly slipped off the drill string in the field to permit rapid replacement if damaged, or if alternate equipment is required. The sleeve carries sensing means for measuring a characteristic of formations penetrated by the well.

4 Claims, 13 Drawing Figures

METHOD OF MAKING WELL LOGGING APPARATUS

BACKGROUND OF THE INVENTION

1. Field of the Invention

This invention relates to apparatus for logging wells during drilling and to methods for making such apparatus.

2. The Prior Art

Although the advantages of simultaneously drilling and logging a borehole have long been recognized, such services have developed slowly because of the lack of reliable equipment which can be quickly repaired or replaced in the field.

Many prior art patents disclose various types of electrically insulated sleeves fitted around the drill string with instrumentation just above the drill bit in an attempt to measure while drilling such variables as formation electrical resistivity, self-potential, temperature, pressure, radioactivity, directional deviation of a drill hole, and the like. Examples of such apparatus are shown in U.S. Pat. No. 2,568,241 to Martin, U.S. Pat. No. 2,930,137 to Arps, U.S. Pat. No. 3,149,683 to Clements et al, and U.S. Pat. No. 3,293,542 to Piety.

The disadvantage of the sleeves previously proposed for logging while drilling is that they cannot be readily removed and replaced in the field, which severely limits their utility.

SUMMARY OF THE INVENTION

This invention provides an insulating sleeve which can be easily and quickly secured around a drill string above the drill bit, and also be quickly and easily removed and replaced by another sleeve if the first sleeve should become damaged, inoperative, or inapplicable for a particular well-logging problem.

Briefly, this invention provides well logging apparatus which includes a housing having a longitudinal opening extending through it. Means are provided at each end of the housing for securing it in a drill string in a well. A replaceable sleeve of electrical insulating material is disposed around the housing, preferably in the vicinity of the drill bit. Means are provided for preventing the sleeve from rotating relative to the housing and yet permit the sleeve to slide longitudinally so it may be easily slipped on or off the housing. Means are provided at one end of the sleeve to prevent the sleeve from sliding longitudinally relative to the housing in one direction, and removable means at the other end of the sleeve prevent it from sliding longitudinally relative to the housing in the opposite direction. Sensing means on the sleeve measure a characteristic of formations penetrated by the well.

In a presently preferred embodiment, the housing is generally cylindrical, one end of the housing is stepped down to a reduced diameter, and the sleeve is disposed around that end. The shoulder where the housing changes diameter limits the longitudinal movement of the sleeve relative to the housing toward the larger-diameter end. Preferably, the external diameter of the sleeve is about the same as that of the unreduced section of the housing. The preferred embodiment also includes a wear ring disposed around the housing between the shoulder and the adjacent end of the sleeve. Means are provided to prevent the wear ring from rotating relative to the housing, and yet let the sleeve slide longitudinally. Preferably, releasable locking means are provided to restrain the ring against sliding.

Preferably, a torque tube is disposed around the reduced diameter portion of the housing adjacent the end of the sleeve remote from the housing shoulder. Suitable means on the torque tube and adjacent portion of the housing prevent the torque tube from rotating relative to the housing, yet permit longitudinal movement of the torque tube along the housing. Means independent of the sleeve are provided for preventing the torque tube from sliding along the housing toward the shoulder in case the sleeve is worn away during drilling.

Mating grooves and splines on the wear ring, sleeve, torque tube, and housing are the presently preferred structure for preventing the wear ring, sleeve, and torque tube from rotating relative to the housing, and yet permit relative longitudinal movement of those elements along the housing.

The sensing means on the sleeve can be any of a variety of devices, such as electrodes for measuring formation electrical resistivity, self-potential, or inductive reactance. The sensing means can be other devices, such as piezoelectric crystals for measuring acoustic properties of adjacent formations in the well bore, or sensors for measuring temperature, pressure, strain, or the like. Means are provided for supplying electrical power to generate signals and for measuring and recording the signals.

In terms of method for fabricating an electrode assembly for attachment to a drill string, the invention includes the steps of forming a sleeve of insulating material having at least one electrical conductor embedded in the sleeve; forming at least one recess in the outer surface of the sleeve; exposing the electrical conductor in the recess; and depositing metal within the recess to at least partly fill it and make electrical contact with at least part of the exposed conductor. Preferably, the metal is deposited by spraying it into the recess in a molten state and allowing it to solidify.

DESCRIPTION OF SPECIFIC EMBODIMENTS

Figure 1:
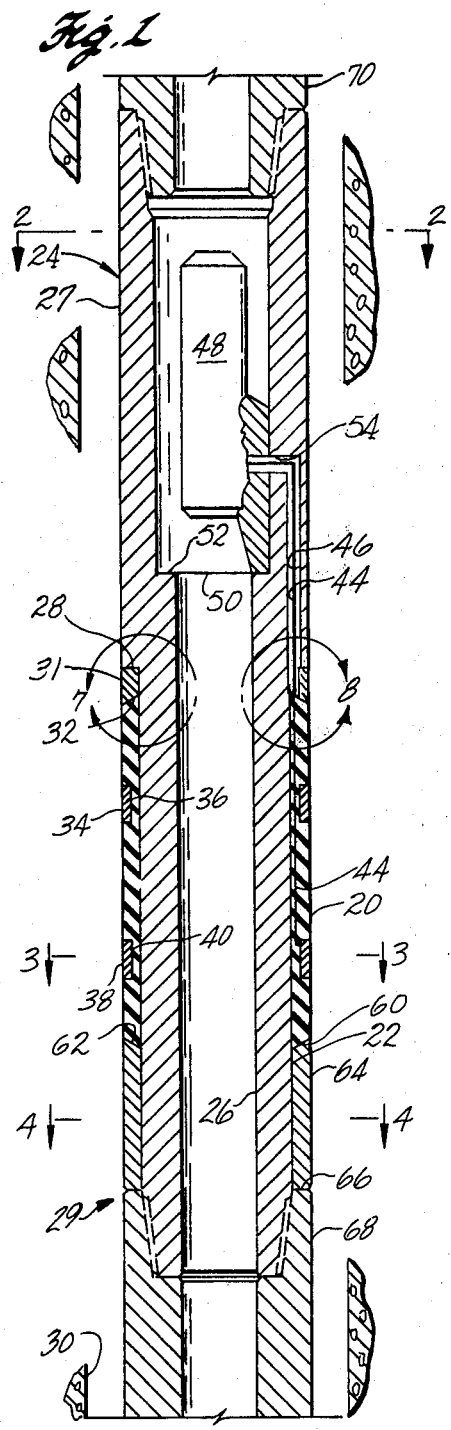
FIG. 1 is a sectional elevation of the invention mounted in a drill string in a well bore.

Referring to FIG. 1, an elongated, cylindrical, hollow sleeve 20 makes a close slip-fit over a lower section 22 of an elongated, generally cylindrical housing 24 having a central longitudinal bore 26 extending through it. The housing includes upper section 27 of larger outside diameter than the lower section 22, so that an annular, downwardly facing (as viewed in FIG. 1) shoulder 28 is formed where the larger section 27 steps down to the smaller diameter of lower section 22. The housing is part of a drill string 29 disposed in a well bore 30.

An annular wear ring 31 makes a close slip-fit around the smaller diameter section 22 of the housing so that the upper surface of the wear ring bears against shoulder 28. The lower surface 32 of the wear ring slopes downwardly and outwardly to rest on a matching surface at the upper end of the sleeve.

An upper electrode ring 34 is disposed in an upper circumferential and outwardly opening groove 36 in the outer surface of the sleeve. A lower annular electrode 38 is disposed in a lower circumferential and outwardly opening groove 40 in the outer surface of the sleeve.

Figure 11:
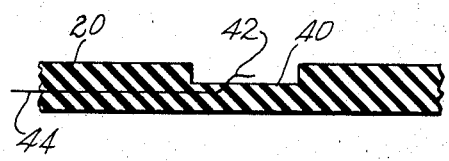
FIG. 11 is a schematic sectional elevation of a portion of the sleeve before the application of electrode material.
Figure 12:
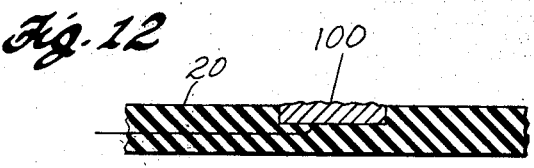
FIG. 12 is a view similar to FIG. 11 showing electrode material applied to the sleeve.
Figure 13:
FIG. 13 is a view similar to FIGS. 11 and 12 showing the electrode in a finished condition.

The upper and lower electrodes are connected by separate electrical conductors 42 (one such conductor is shown in FIGS. 11-13) in a cable 44, which extends up through the insulated sleeve and a cable tunnel 46 formed through the wear ring and the wall of the housing.

Figure 2:
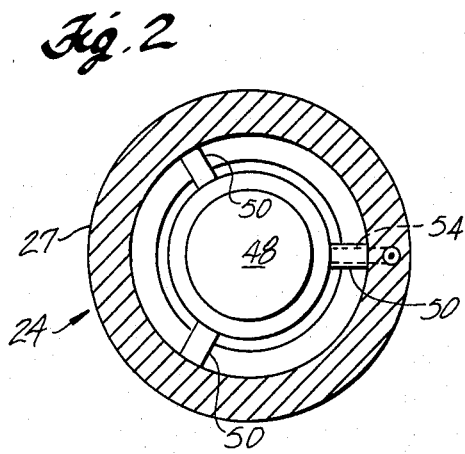
FIG. 2 is a view taken on line 2—2 of FIG. 1.

The upper end of the cable is connected to a power and instrument package 48, which includes an electrical power source (not shown) and appropriate equipment (not shown) for generating, measuring, and recording signals developed in response to various physical characteristics of the adjacent formation in the well bore. The power and instrument package is secured in the center of the central bore 26 of the housing by three equally spaced and radially extending spiders 50 secured at their inner ends to the power and instrument package. The outer ends of the spiders bear against the interior surface of the bore through the housing. The lower edges of the spiders rest on an annular and upwardly facing internal shoulder 52 formed within the bore 26 in the housing. As shown in FIGS. 1 and 2, the cable tunnel includes a horizontal section 54, which extends from the power and instrument package through one of the spiders to join the upper end of the vertical portion of the cable tunnel in the wall of the housing.

The lower end of the insulated sleeve has a downwardly and inwardly extending annular surface, which rests on a matching surface 62 on the upper end of a torque tube 64, which makes a close slip-fit around the lower portion of the housing. The lower end of the torque tube rests on an upwardly facing annular shoulder 66 at the upper end of a drill collar section 68, into which the lower end of the housing is threaded. The upper end of the housing is threaded onto the lower end of a section of drill collar 70 in the drill string.

Figure 3:
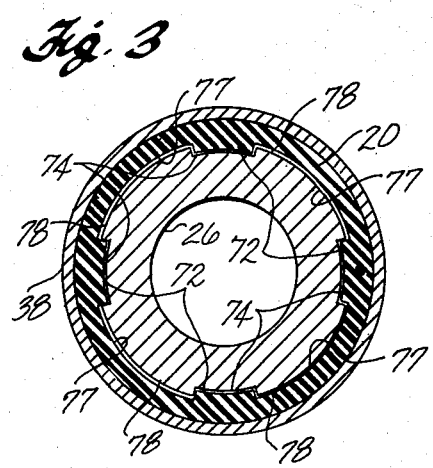
FIG. 3 is a view taken on line 3—3 of FIG. 1.

As shown in FIG. 3, the insulating sleeve includes four equally spaced, inwardly projecting, and longitudinally extending splines 72, which each fit into a respective matching outwardly opening and longitudinally extending groove 74 in the outer surface of the housing. The splines on the insulated sleeve extend for the full length of the sleeve. The grooves in the exterior surface of the housing extend from about the midpoint of the wear ring to the lower end of the torque tube, which has four equally spaced, inwardly projecting splines 76 (FIG. 4) which extend longitudinally for the length of the torque tube and fit into the housing grooves.

In effect, the splines 72 on the sleeve form a separate longitudinally extending groove 77 between adjacent splines, and the grooves 74 in the housing form a separate longitudinally extending spline 78 between adjacent grooves.

The bottom surfaces of the grooves and the top surfaces of the splines of the sleeve and the housing taper inwardly away from the shoulder to facilitate assembly and disassembly of the sleeve on the housing. The amount of taper can vary over a wide range, but we have found that a relatively slight taper, say, about ⅛" in 13 feet, is adequate to provide an easy, but close slip-fit of the sleeve on the housing.

The splines 76 on the torque tube form a separate longitudinally extending groove 79 between adjacent splines. The grooves and splines of the sleeve and torque tube make a close slip-fit with the grooves and splines of the housing so the torque tube is firmly supported against rotation relative to the housing, but is easily moved longitudinally when necessary.

Figure 4:
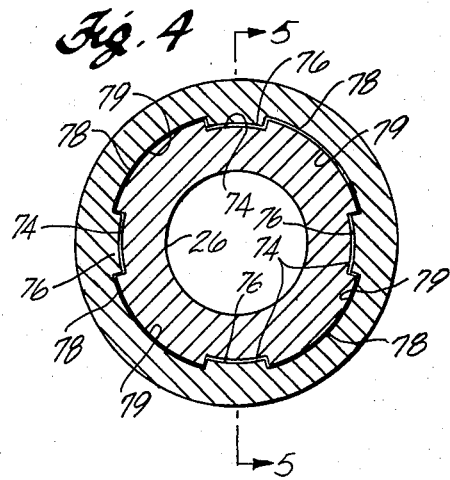
FIG. 4 is a view taken on line 4—4 of FIG. 1.
Figure 5:
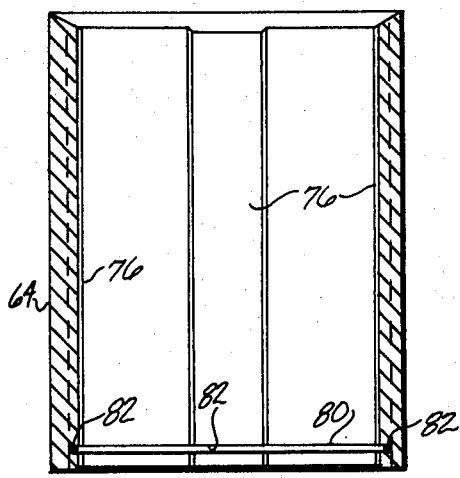
FIG. 5 is an enlarged sectional elevation taken on line 5—5 of FIG. 4, and in which the housing is not shown.
Figure 6:
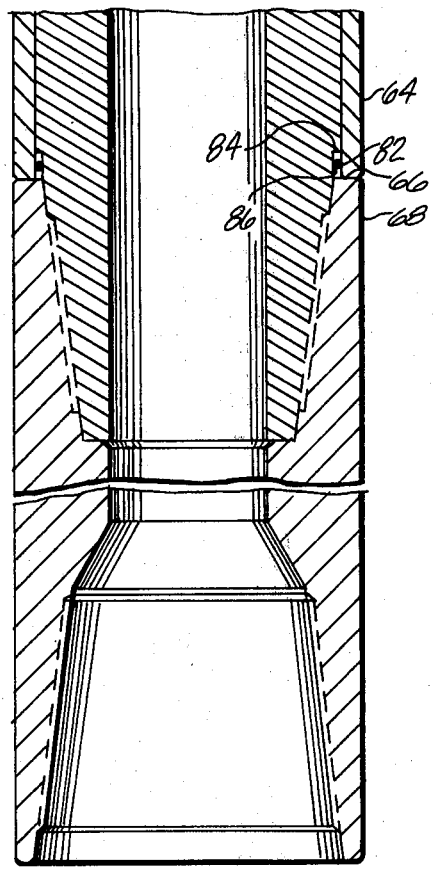
FIG. 6 is an enlarged sectional elevation taken on line 6—6 of FIG. 4.

Referring to FIG. 5, which is a view taken on line 5—5 of FIG. 4 (with the housing not shown), a wire retaining ring 80 is disposed in four inwardly opening, circumferential grooves 82 formed in the lower ends of the torque tube splines 76, so the wire is secured under an outwardly extending and downwardly facing shoulder 84 (FIG. 6), where the o.d. of the housing is reduced for a short, vertical section 86 adjacent the upper end of the lower drill collar section 68. The retaining ring 80 prevents the torque tube from sliding upwardly along the housing if the insulated sleeve should be worn away during drilling operations.

Figure 7:
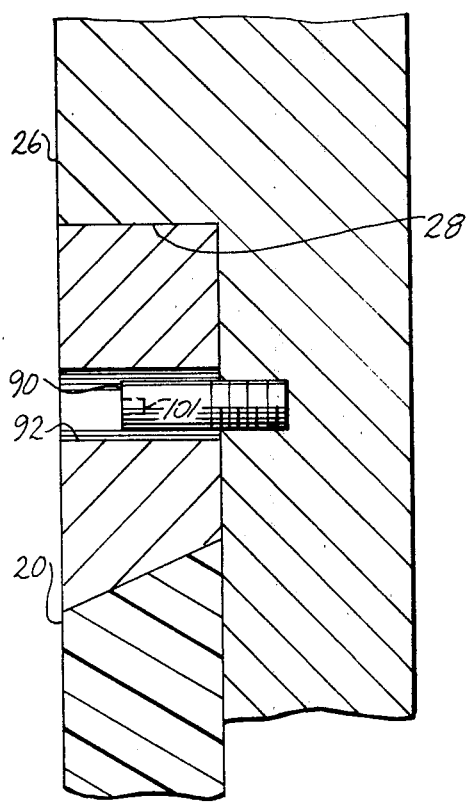
FIG. 7 is an enlarged view taken in the area of 7—7 of FIG. 1.

Referring to FIG. 7, the wear ring is prevented from sliding downwardly (if the insulated sleeve should be worn away during drilling operations) by a bolt 90 threaded into the housing wall to project outwardly into the inner end of a bore 92 extending radially through the wear ring wall. More than one such bolt can be used, if desired. Three inwardly and longitudinally extending splines 93 (FIGS. 9 and 10) on the inner surface of the lower half of the wear ring each fit into a respective groove 74 in the outer surface of the housing to prevent the wear ring from rotating on the housing, and yet leave the wear ring free to slide longitudinally when the bolt 90 is removed.

Figure 8:
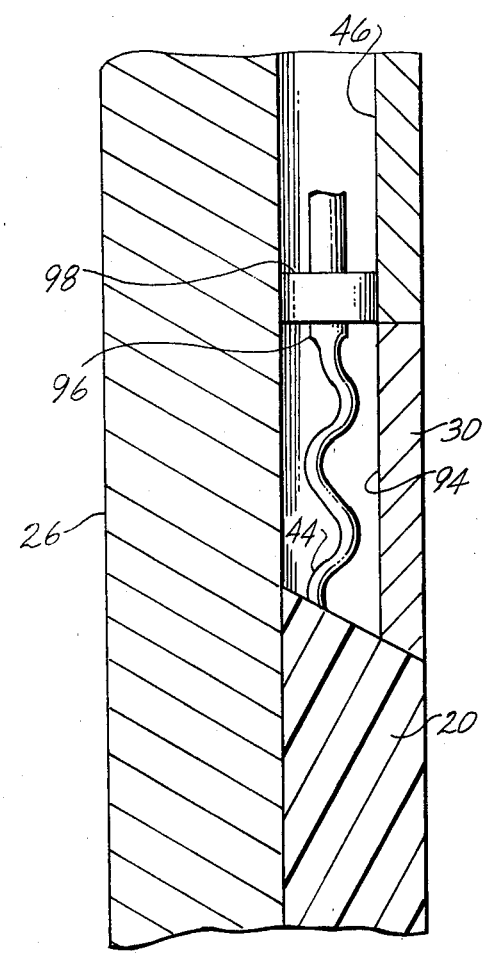
FIG. 8 is an enlarged view taken in the area of 8—8 of FIG. 1.
Figure 9:
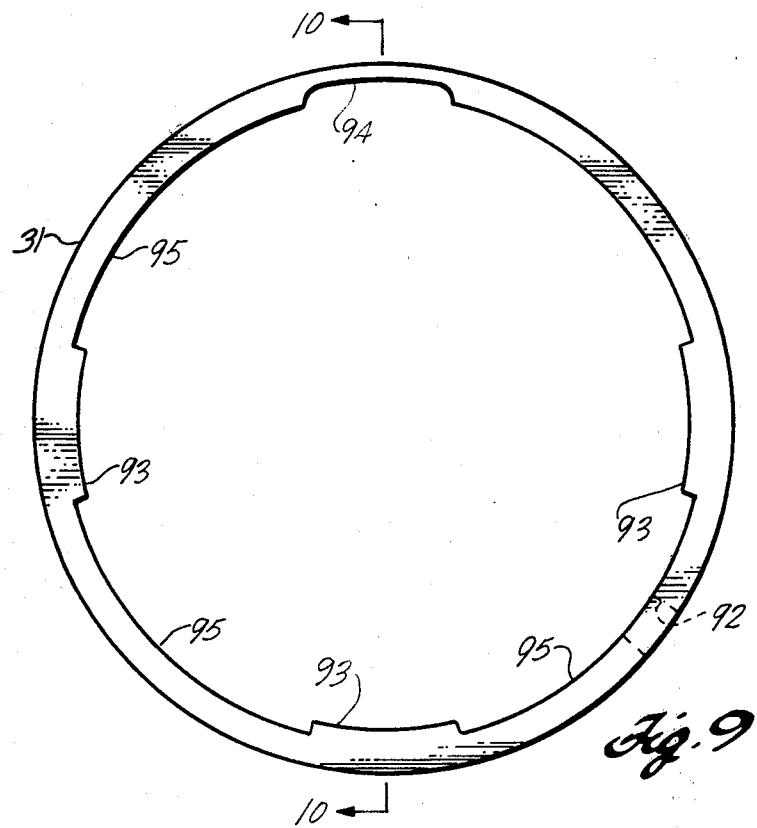
FIG. 9 is an end view of the wear ring.
Figure 10:
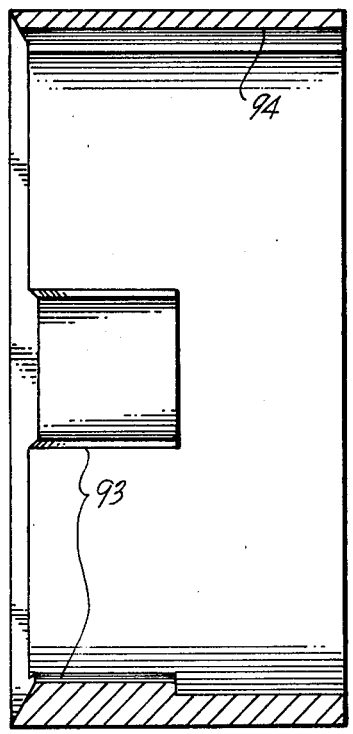
FIG. 10 is a view taken on line 10—10 of FIG. 9.

As shown best in FIG. 8, the upper end of the electrical cable 44 extends from the upper end of the insulating sleeve into a longitudinally extending slot 94 (FIGS. 9 and 10) in the interior surface of the wear ring. As shown in FIG. 9, the slot 94 is spaced 90° from two of the wear ring splines 93, which are each spaced 90° from the third spline. Thus, the three wear ring splines each form a separate respective groove 95 between adjacent splines, the groove which includes slot 94 being twice as wide as the other two. Accordingly, the grooves and splines of the wear ring make a close slip-fit with all four of the splines on the housing, but with only three of the grooves in the housing because of wear ring slot 94. This is adequate support to restrain the wear ring from rotating relative to the housing.

The upper end of the cable carries a connector plug 96, (FIG. 8), which releasably fits into a socket 98 sealed in the lower end of the vertical portion of the cable tunnel 46 in the wall of the housing to prevent incursion of drilling fluid into the power and instrument package. The plug 96 is provided with suitable sealing means (not shown), which may be of conventional construction, to prevent incursion of high-pressure fluids from the well bore into the electrical connections made by the plug with the socket.

The material which forms the insulated sleeve must withstand high temperatures and shock. It must also have reasonably good wear resistance to the abrasive conditions encountered during the drilling of most wells, and it must have high electrical resistivity to avoid unacceptable leakage between the drill string and electrodes or other sensing devices on the sleeve. These requirements are met by forming the insulating sleeve from glass fibers and epoxy resin, which includes particles of abrasion-resistant material, such as aluminum oxide sold under the trademark "Carborundum". U.S. Pat. No. 3,072,843 to Clements et al describes the use of such materials to form an electrode sleeve on a drill pipe.

We have prepared suitable insulating sleeves by wrapping glass fibers coated with epoxy resin and Carborundum particles around a mandrel (not shown) which matches the surfaces of the portion of the housing around which the insulated sleeve is to fit. During the wrapping operation, the appropriate electrical conductors are embedded in the wall of the insulating sleeve as it is formed. The top and bottom surfaces of the splines and grooves of the mandrel taper toward one end to match that of the housing. Accordingly, after the resin has cured, the formed sleeve can be easily slipped off the mandrel, and the internal surfaces of the sleeve are tapered to match those on the housing.

The principal steps in making an electrode sleeve assembly, say, useful for electric well logging, are shown in FIGS. 11-13. Outwardly opening, circumferential grooves 40 (only one groove is shown in FIGS. 11-13) are formed in the outer surface of the sleeve to reach the end of one of the conductors 42 embedded in the sleeve wall during the production of the sleeve. The end of the conductor is raised into the groove and stripped of insulation to expose bare metal.

As shown in FIG. 12, a metallic conductor material 100 is deposited in the prepared groove to invest the exposed end of the conductor. The deposited metal may be sprayed into place by the well-known Metco process. It may also be electrodeposited, accumulated by vapor deposition, or any combination of such processes. Spray deposition is presently preferred. As shown in FIG. 13, the deposited metal is smoothed so that its outer surface is flush with the outer surface of the sleeve, leaving an annular electrode 38.

In using the replaceable sleeve of this invention, it is assembled as shown in FIG. 1, so that it is firmly supported on the housing and clamped between the wear ring at its upper end and the torque tube at its lower end. The torque tube is made of steel of sufficient strength to accept the wear and stress imposed by conventional tongs (not shown) when the housing is threaded into, or out of, a drill collar. The annular shoulder 66 on the drill collar holds the torque tube in a snug fit against the sleeve, which is thereby placed in slight, but firm, compression for the drilling operation. The torque tube accepts all of the mechanical wear and tear in connecting or disconnecting the housing in the drill string.

Although the insulated sleeve can vary in length for different uses, for most well logging operations, it will be between about 2 and about 15 feet long. If it is relatively short, say, only a foot or two, the torque tube may be omitted, letting the lower end of the electrode sleeve bear directly against the shoulder 66 on the drill collar section 68. Under these circumstances, the tongs, normally used to make up or break apart drill string, would have to be shifted upwardly from their normal position to engage the housing above the insulating sleeve. If the sleeve is more than a few feet long, it normally would not be feasible to raise the tongs sufficiently high to avoid contact with the sleeve. Accordingly, the torque tube is almost always required for practical operations.

Although the insulating sleeve in the specific embodiment described above is built to facilitate measuring the electrical resistivity of formations traversed by the well bore, the sleeve can be provided with other sensing devices for measuring other characteristics of the formations. For example, piezoelectric crystals can be embedded in the sleeve to measure acoustical properties, or other sensors can be used to measure pressure, temperature, or borehole deviation during the drilling.

An important advantage of this invention is that the insulating sleeve can be quickly and easily assembled on, or removed from, the primary housing. This is essential in most drilling operations where delays in handling equipment at a drilling rig are expensive and sometimes dangerous.

If the insulated sleeve is damaged or worn away during drilling operations, the wear ring protects the annular shoulder 28 on the housing from damage. The retaining ring in the lower end of the torque tube prevents the tube from sliding up and down the housing, avoiding possible damage to the housing or the wear ring.

In the course of prolonged use, the wear ring may eventually be so worn or damaged that it no longer protects the shoulder or holds the insulated sleeve in the desired position on the housing. The wear ring is then easily removed and replaced by a new one.

If desired, a second wear ring of appropriate size and shape can be disposed between the torque tube and the lower end of the insulated sleeve to prevent damage to the upper end of the torque tube when the insulated sleeve is worn away.

The insulated sleeve is easily replaced by simply slipping it off the lower end of the housing after the housing is removed from the drill collar section 68, and the torque tube is slipped off the lower end of the housing. The electrical plug 96 (FIG. 8) is disconnected by removing the bolt 90 (FIG. 7) from the bore 92 in the wear ring wall so the wear ring and insulating sleeve can be lowered a few inches to provide access to the plug 96, which is then removed. A similar plug (not shown) on a replacement sleeve (not shown) is connected to the socket 98 and sealed thereto by appropriate means (not shown). The wear ring is then raised back to its position against shoulder 28 on the primary housing and locked in place by inserting the bolt 90, which has an internal hex socket 101 to facilitate screwing the bolt into and out of the housing wall. The torque tube is slipped over the lower end of the housing to the position shown in FIG. 1. The tongs are applied to the torque tube, and the lower end of the housing is threaded into the upper end of the drill collar section 68 until the torque tube, insulated sleeve, and wear ring are snugly fitted together as shown in FIG. 1.

With the apparatus assembled as shown in FIG. 1, it can be used to log the electrical resistivity of formations traversed as the well is drilled. The logging information can be either recorded with equipment (not shown) in the power and instrument package, or it can be transmitted to the surface during drilling by generating coded pressure pulses in the drilling fluid, such as described in U.S. Pat. No. 3,964,556 to Gearhart et al or U.S. Pat. No. 4,078,620 to Westlake et al.

From the foregoing description, it will be apparent that this invention provides an insulated sleeve which can be quickly and snugly fitted around a portion of the drill string so the sleeve is not rotatable relative to the drill string, and so the sleeve can be quickly slipped off the drill string, when required.

We claim:

1. A method for making an electrode assembly adapted to slide on and off a drill string to be used in a well for measuring electrical resistivity of earth formations traversed by the well, the method including the steps of:
   (a) forming a sleeve of insulating material by wrapping resin-coated fibers around an elongated and generally cylindrical mandrel, the mandrel having an exterior surface which converges toward one end so the sleeve is formed with an internal converging surface matching the external surface of the mandrel;
   (b) embedding at least one electrical conductor in the sleeve;
   (c) forming a recess in the outer surface of the sleeve to expose the embedded electrical conductor in the vicinity of the recess;
   (d) depositing metal within the recess to at least partially fill it and make electrical contact with at least part of the exposed electrical conductor;
   (e) curing the resin while the fibers are wrapped around the mandrel; and
   (f) thereafter slipping the sleeve from the mandrel and thereafter slipping the sleeve onto a drill string having an external surface matching that of the mandrel.

2. A method according to claim 1 in which the formation of the recess includes forming an outwardly opening, circumferential groove in the outer surface of the sleeve.

3. A method according to claim 1 or 2 in which the external surface of the mandrel includes longitudinally extending grooves and splines with surfaces which converge toward one end of the sleeve.

4. A method for making a logging assembly adapted to slide on and off a drill string in a well for measuring a downhole characteristic in the well, the method including the steps of:
   (a) forming a sleeve of insulating material by wrapping resin-coated fibers around an elongated and generally cylindrical mandrel, the mandrel having an exterior surface which converges toward one end so the sleeve is formed with an internal converging surface matching the external surface of the mandrel;
   (b) embedding at least one electrical conductor in the sleeve;
   (c) securing sensing means to the sleeve;
   (d) connecting the electrical conductor to the sensing means;
   (e) curing the resin while the fibers are wrapped around the mandrel; and
   (f) thereafter slipping the sleeve from the mandrel and ther after slipping the sleeve onto a drill string having an external surface matching that of the mandrel.

* * * * *